Aug. 23, 1949.　　　F. F. MILLER, JR　　　2,480,039
SHAFT COUPLING
Filed Dec. 11, 1944　　　　　　　　　　　　2 Sheets-Sheet 1
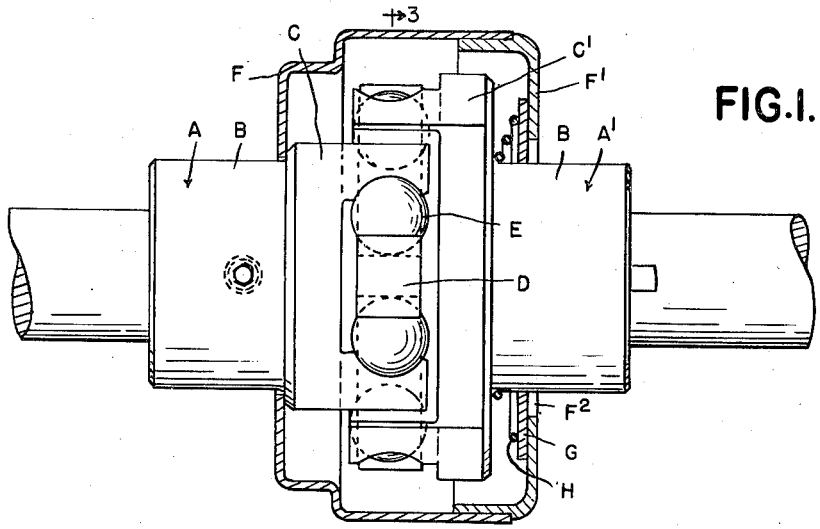
FIG.I.
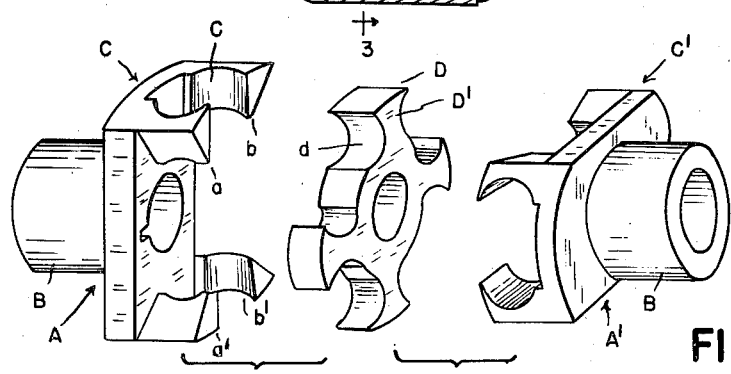
FIG.2.
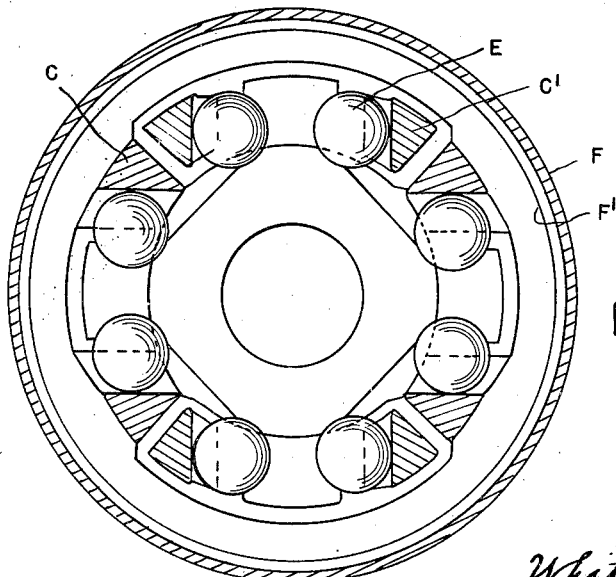
FIG.3.
INVENTOR.
FRED F. MILLER JR.
BY
Whittemore Hulbert & Belknap
ATTORNEYS Aug. 23, 1949.　　　F. F. MILLER, JR　　　2,480,039
SHAFT COUPLING Filed Dec. 11, 1944　　　　　　　　　　2 Sheets-Sheet 2

INVENTOR.
FRED F. MILLER JR.
BY
*Whittemore Hulbert & Belknap*
ATTORNEYS

Patented Aug. 23, 1949

2,480,039

UNITED STATES PATENT OFFICE 2,480,039

SHAFT COUPLING

Fred F. Miller, Jr., Berkeley, Mich., assignor to The Gear Grinding Machine Company, Hamtramck, Mich., a corporation of Michigan Application December 11, 1944, Serial No. 567,656

2 Claims. (Cl. 64—31)

The invention relates to shaft couplings which are adapted to communicate rotary motion from one shaft to another where the axes of said shafts are slightly misaligned.

It is one of the objects of the invention to obtain a construction which will permit lateral, as well as angular misalignment, of the shafts.

It is a further object to obtain a construction in which friction is reduced to a minimum.

Still further it is an object to obtain a relatively simple construction and one which can be easily manufactured. With these objects in view, the invention consists in the construction as hereinafter set forth.

In the drawings:

Fig. 1 is a side elevation showing a pair of shafts connected by my improved coupling;

Fig. 2 is a perspective view showing the several members of the coupling detached from each other;

Fig. 3 is a cross section on line 3—3, Fig. 1;

My improved shaft coupling comprises like oppositely arranged members connected respectively to the two shafts and a central cross-shaped torque transmitting member therebetween. The shaft engaging members A and A' each comprises a hub portion B and spaced diametrically opposite pairs C, C' of transversely spaced axially extending portions $a$, $b$ and $a'$, $b'$. The portions $a$, $b$ and $a'$, $b'$ have ball races $c$ formed in their opposed inner faces, which races extend parallel to a central radial line therebetween. The spacing between the pairs C, C' is such as to receive the corresponding portions of the oppositely arranged shaft members when in overlapping relation thereto in a transverse plane and with sufficient clearance to permit of limited radial movement of each of said shaft members with respect to the other. D is a central cross-shaped member, each of the prongs D' of which extends radially between the axially extending portions of one of said pairs. These prongs D' are formed with ball races $d$ on their opposite sides which extend axially and are so positioned with respect to the adjacent ball races $c$ as to receive balls E therebetween. Thus, when the parts are assembled, the members A, A' are free to have a limited lateral angular and axial movement in relation to each other, while at the same time they are coupled in each position to transmit torque without lost motion therebetween by the members D and balls E. The assembled parts are housed by casing members F and F' which telescopically engage each other and are axially apertured to be sleeved on the hubs B. One of these casing members F' has radial clearance $F^2$ around the hub B sufficient to permit of the maximum lateral and angular movement of the members A, A' with respect to each other. The clearance spaced $F^2$ is closed by a member G sleeved on the hub and held against the member F' by a spring H.

With the construction as above described, it will be obvious that two shafts which are slightly misaligned may be coupled to each other so as to transmit torque from one to the other. This misalignment may be either with the axes of the two shafts substantially parallel but slightly offset or where these axes are at a slight angle to each other. In either case, torque will be transmitted without any lost motion and because of the antifriction ball bearings, frictional losses are negligible.

Figure 4:
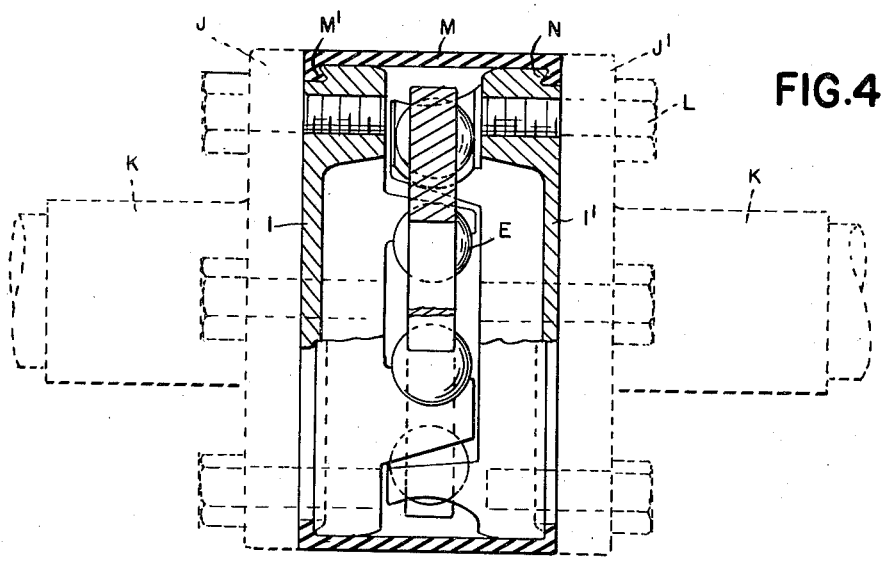
Fig. 4 is an axial section of a modified construction.

With the modified construction illustrated in Fig. 4 instead of providing the members A and A' with hubs for attachment to their respective shafts, these members are formed with circular face plates I and I' which are bolted or otherwise secured to complementary face plates J and J' secured to their respective shaft members. This construction permits of engaging the coupling without displacement of the shaft members which is advantageous with many installations. Thus, the complementary face plates J and J' may have hubs K for engagement with the shafts, there being sufficient space between the ends of said shafts for laterally inserting the coupling. Bolts L are then used for attaching the complementary face plates to each other, said bolts being inserted through apertures in the members J and J' and engaging registering threaded apertures in the members I and I'. This construction also is one which can be used with a simple form of flexible sealing means for retaining the lubricant within the coupling. Such sealing means comprises a sleeve M formed of synthetic rubber or other flexible resilient material which is not detrimentally affected by the lubricant and the opposite ends of this sleeve are secured to the peripheries of the members I and I'. Preferably the peripheral portions of said members I and I' have undercut grooves N formed therein for receiving radially inwardly extending flanges M' of the sleeve M, said flanges being of a dovetail cross section. The complementary face plates J and J' when bolted to the members I and I' will clamp the flanges M' and effectively secure the sleeve from displacement. However, during operation the sleeve permits the required relative movement of the members I and I' and at all times retains the lubricant within the coupling. Also, the sleeve M serves to hold the members I and I' in assembled relation to each other forming a self-contained unit.

Figure 5:
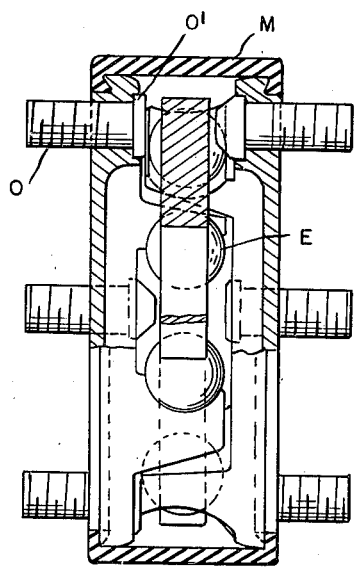
Fig. 5 is a similar view showing another modification.

The modification shown in Fig. 5 is the same as that of Fig. 4 with the exception that in place of the bolts L secured from the outside, bolts O are arranged with their heads O' within the unit and their threaded portions extending outward for attachment to the complementary flanges of the shaft members. Such construction cannot, however, be engaged with shafts which are mounted in fixed relation to each other.

What I claim as my invention is:

1. A shaft coupling comprising two like oppositely arranged shaft engaging members, each having pairs of circumferentially spaced axially extending portions on diametrically opposite sides thereof adapted to overlap the corresponding portions of the other member with only sufficient clearance therebetween for a limited lateral and angular relative movement, a cross-shaped member between said shaft members having the prongs thereof respectively between the circumferentially spaced axially extending portions of the respective pairs, each of said prongs having axially extending ball races formed on opposite sides thereof and each of said axially extending portions having ball races on the opposed faces thereof extending parallel to a radially extending line centrally therebetween, and balls engaging said ball races for transmitting torque without lost motion between said members in all positions of adjustment thereof.

2. A shaft coupling comprising two like oppositely arranged shaft engaging members each having a circular disc portion and pairs of circumferentially spaced axially extending portions on diametrically opposite sides thereof adapted to overlap the corresponding portions of the other member with only sufficient clearance therebetween for a limited lateral and angular relative movement, a floating cross-shaped member between said shaft members having the prongs thereof respectively between the circumferentially spaced axially extending portions of the respective pairs, antifriction means between the latter portions and adjacent prongs adapted to transmit torque without lost motion, and a flexible resilient sleeve member having its opposite ends peripherally secured to said shaft members constituting the sole means for holding said members in assembled relation when unattached to their respective shafts and also retaining lubricant.

FRED F. MILLER, Jr.

REFERENCES CITED

The following references are of record in the file of this patent:

UNITED STATES PATENTS

| Number | Name | Date |
|---|---|---|
| 1,648,078 | Thomsen | Nov. 8, 1927 |
| 2,007,897 | Skeel | July 9, 1935 |
| 2,080,296 | Wood | May 11, 1937 |
| 2,264,728 | Stillwagon, Jr., et al. | Dec. 2, 1941 |
| 2,293,717 | Dodge | Aug. 25, 1942 |

FOREIGN PATENTS

| Number | Country | Date |
|---|---|---|
| 426,748 | Germany | 1926 |